Dec. 6, 1966 K. ADLER ETAL 3,290,528
DIRECT CURRENT DOUBLE AIR CAP MOTOR
Original Filed May 7, 1963 2 Sheets-Sheet 1

INVENTORS
Karl Adler and Georges Ducommun
BY
*Imirie & Smiley*
ATTORNEYS

United States Patent Office 3,290,528
Patented Dec. 6, 1966

3,290,528
DIRECT CURRENT DOUBLE AIR GAP MOTOR
Karl Adler, Ruti, Buren, and Georges Ducommun, Grenchen, Switzerland, assignors, by mesne assignments, to Biviator S.A., Geneva, Switzerland, a corporation of Switzerland
Continuation of application Ser. No. 278,731, May 7, 1963. This application Mar. 8, 1966, Ser. No. 536,553
Claims priority, application Switzerland, May 12, 1962, 5,690/62
9 Claims. (Cl. 310—266)

This application is a continuation of Serial No. 278,731, filed May 7, 1963, now abandoned.

This invention relates to a direct current micro motor adapted to start up and to deliver mechanical energy with extremely small available electrical power. As an example, the motor is able to wind up a timepiece when connected to a battery of photoelectric cells having a size in the order of 75 cm.$^2$ and exposed to an illumination of 10 lux. Extensive experiments have shown that under these circumstances a useful output is only obtained if a number of conditions are fulfilled, whereby the general disposition of the micro motor substantially differs of the usual structure of direct current motors. Care must be taken that the available current is always used most efficiently for producing a driving turning moment, this being impossible with classical direct current motors comprising series-connected rotor windings.

The micro motor according to this invention broadly comprises a commutator, separate windings of diametral pitch electrically isolated from each other and having winding ends connected to diametrically opposite commutator segments of the commutator, magnetizable means including a permanent magnet forming an air gap for accommodation of winding portions, brush means cooperating with said commutator for alternatively and successively connecting one of said windings to said brush means for feeding said one winding with direct current, said magnetizable means being formed to produce a homogeneous magnetic field in said air gap of such a circumferential extension that each winding is completely within said homogeneous field for any position wherein it is connected to said brush means. Under these conditions all current-carrying conductors of all windings will always be within the practically homogeneous magnetic field and will fully add to the production of the turning moment of the motor. When using a stator comprising the said permanent magnet, the pole pieces and the magnetizable core of the stator will preferably be shaped in such a way that all magnetic field lines of the homogeneous field extend in radial direction so that the electro-mechanical forces acting onto the conductors of the rotor windings always have a substantially circumferential direction and thus produce a maximum turning moment. In order that the above conditions may be fulfilled, it is preferable to use windings of which the circumferential length is smaller than any other dimension of the windings.

Two embodiments of the invention are shown, by way of example, in the attached drawings wherein.

Figure 2:
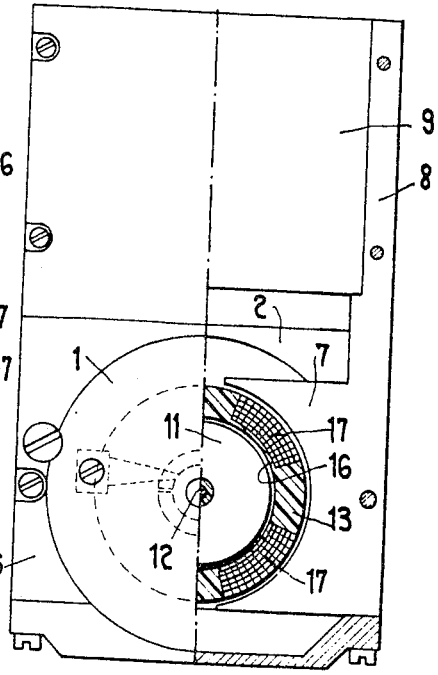
FIG. 2 shows the motor partially in elevation and partially in section, along line II—II in FIG. 1.

The bearing brackets or plates 1 and 2 are provided with jewels 3 and 4. Jewel 4 may be adjusted in axial direction by means of a screw 5. The bearing plate 2 is directly connected to the pole pieces 7 of the motor whereas a ring 6 is inserted between bearing plate 1 and the pole pieces 7. As shown in FIG. 2 the pole pieces 7 are made in one piece with yokes 8. A permanent magnet 9 is inserted between yokes 8.

The bearing plate 2 has a tubular extension 10 carrying a soft iron core 11 made of magnetizable material having as low electrical conductivity as possible in order to avoid eddy currents in this core. The motor shaft 12 is pivoted in bearings 3 and 4 by means of ground pivots. The shaft extends through bores of the extension 10 and of core 11. A winding body or rotor 13 of substantially cylindrical shape is fixed on shaft 12. An axial extension 14 of rotor 13 forms the support of the commutator 15. The winding body or rotor 13 comprises four slots 16 having a circumferential width less than ¼ of the rotor circumference. The rotor 13 is made of plastic material of any other suitable non-magnetizable insulating material. Axially extending portions of two windings 17 of diametral pitch and arranged in mutually perpendicular planes are accommodated in slots 16. The winding portions outside the slots 16 are supported on the cylindrical end portions of rotor 13 and thus are of substantially circular shape concentric to the motor shaft 12. By this arrangement of the winding portions outside the slots 16 electromagnetic forces acting in circumferential direction on such winding portions due to stray flux are avoided. Windings 17 are completely insulated from each other and the terminals of each winding are connected to diametrically opposite commutator segments.

Two brush holders 18 of insulating material support each a pair of contact springs 19 of an elastic non-oxydizable gold alloy. The contact springs or brushes 19 of each pair enclose a small angle substantially corresponding to the angular distance or angular width of the gap between adjacent commutator segments. By this arrangement current flow in at least one winding is obtained for any position of the gaps between commutator segments relatively to the contact springs 19. Each pair of brushes 19 is connected to one terminal of a direct current source.

Within a hollow space of the bearing plate 2 a pinion 20 is fixed on the motor shaft 12, this pinion meshing with a wheel of a reduction gear not shown in the drawing. The reduction gear may include a return stop and may serve for rewinding a timepiece.

Figure 1:
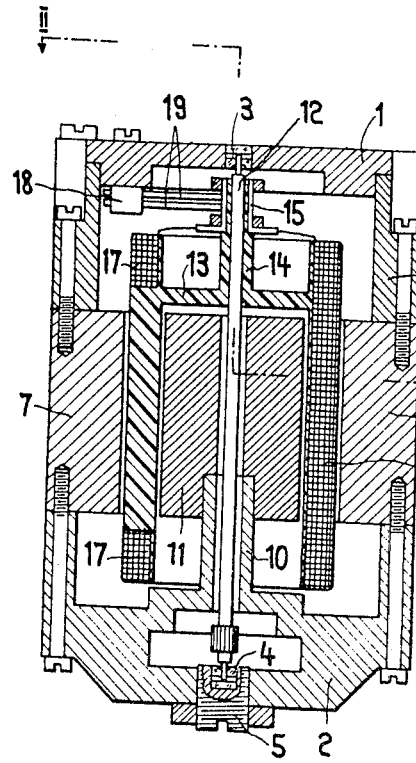
FIG. 1 is an axial section of the first embodiment.
Figure 3:
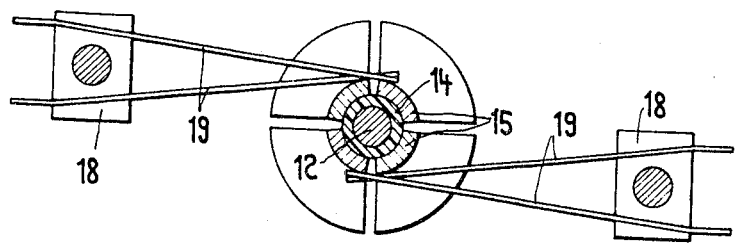
FIG. 3 is a schematic illustration of the commutator and brush means of the motor.

The operation of the motor shown in FIGS. 1 to 3 is as follows: When the rotor 13 takes the position shown in FIG. 2, the commutator is in its "neutral" position shown in FIG. 3. The one winding 17 that has previously been energized will now be disconnected from the brushes and the current will be fed to the other winding, whereby both windings may be current-carrying for a short time. As shown in FIG. 2 the slots 16 and the winding spaces of windings 17 respectively and the circumferential length of the pole pieces 7 are so disposed that for the illustrated neutral position all conductors of both windings 17 are fully within a practically homogeneous magnetic field set up between the pole pieces 7 and the core 11, so that the total current flow in all conductors of the windings fully contributes to the driving turning moment. When the previously energized winding is disconnected the full current flow is carried by one winding which will fully remain in the homogeneous portion of the magnetic field during its energization, that is for a rotating angle of about 90°. Since all conductors of both windings are completely within the homogeneous portion of the magnetic field produced in the air gap for the neutral position shown in FIG. 2, it is evident that all conductors of each winding are within the homogeneous field as long as the winding is connected to the current source. Consequently, each winding will produce a constant maximum turning moment for its full current-carrying periods. Due to this fact, a substantially constant speed of the rotor is obtained, this being important for making optimal use of the available electric energy because the counterelectromotive force is practically constant under the conditions specified above. A continuous optimal matching between the apparent resistance $$Ws = \frac{\text{source voltage} - \text{counterelectromotive force}}{I}$$

and the source is thus possible (wherein I is the current). This possibility is of particular importance where the motor is energized by a photoelectric battery because an optimal working point may be adjusted for the battery and the motor, this working point remaining substantially constant.

In order to obtain the said practically homogeneous radial field in the air gap of the stator it is preferable to choose an air gap length, that is a radial distance between the inner surfaces of the pole pieces 7 and the core 11, substantially less than the shortest distance between opposite pole pieces. Under these conditions it is equally possible to avoid excessive stray flux and to make good use of the available magnetic flux.

It was found that the stray flux within reach of the winding portions outside the pole pieces 7 and the core 11 respectively should be kept as low as possible in order to avoid breaking moments. One important feature for reducing this stray flux consists in the arrangement of the pole pieces 7, the yokes 8 and the magnet 9 in a common symmetry plane perpendicular to the motor shaft. For obvious reasons the main portion of the stray flux will be parallel to the said common symmetry plane and will thus be without effect on the winding portions axially projecting from the air gap.

The following table shows the dimensions and characteristics of a motor of the type described above suitable for operation at a voltage of 0.12 volts and 50 microamperes produced by a photoelectric battery. This power may for instance be produced by a battery of six selenium-photocells connected in parallel and having a total surface of 75 cm.² exposed to an illumination of 10 lux. The motor is able to rewind the spring of a high quality timepiece at an illumination of 20 lux within 5 hours.

| | | |
|---|---|---|
| Voltage | volts | .12 |
| Current | A | .00005 |
| Induction in air gap | gauss | 750 |
| Conductors per winding | | 950 |
| Length of conductors | cm | 1.6 |
| Circumferential speed of rotor | cm./sec | 5.3 |
| Speed | r.p.m | 60 |
| Rotor diameter | cm | 2 |
| Core diameter | cm | 1.35 |
| Core length | cm | 1.6 |
| Pole length | cm | 1.6 |
| Pole diameter | cm | 2.25 |
| Pole distance | cm | 1.3 |
| Air gap length | cm | .45 |
| Total force on both winding sides | gr | .0114 |
| Turning moment | gr./cm | .0114 |
| Electromotive force | volts | .114 |
| Rotor resistance | ohms | 120 |
| Conductor diameter | mm | .12 |

The overall dimensions of the motor may be reduced when a permanent magnet is used instead of the soft iron core 11, this permanent magnet being so magnetized that a homogeneous field of the above characteristics is produced in the air gap between the permanent magnet and a cylindrical soft iron mantle enclosing the permanent magnet. The permanent magnet should also have low electrical conductivity in order to avoid eddy current losses in this magnet. Instead of a rotor carrying the windings the permanent magnet of such a motor may be fixed on the motor shaft and stationary windings may be accommodated in the air gap, such windings being alternatively energized by collector means associated therewith. In this case the size and weight of the windings is not limited by the necessity of accommodating them on the rotor so that higher turning moments may be obtained. It would be easier to accommodate a higher number of individual windings.

Figure 4:
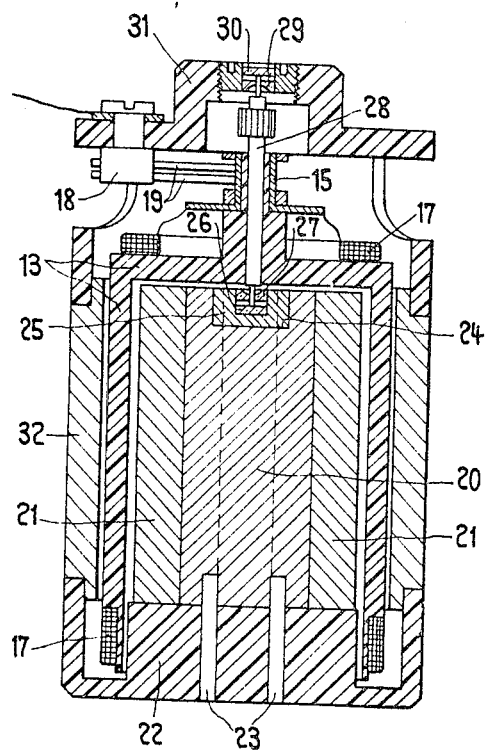
FIG. 4 is an axial section of the second embodiment and FIG. 5 is a cross section of the second embodiment.
Figure 5:
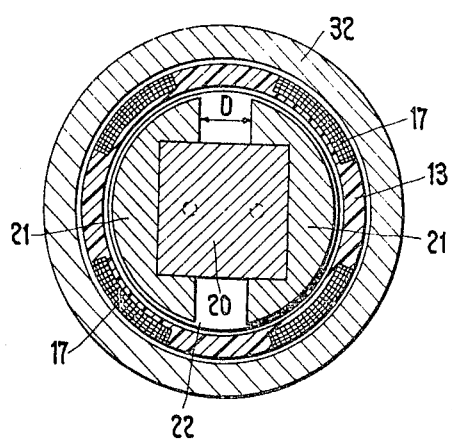

A motor having a permanent core is shown by way of example in FIGS. 4 and 5. Parts of this motor are designated with the reference numerals used for analogous parts in FIGS. 1 to 3.

The motor shown in FIGS. 4 and 5 has a permanent magnet 20 carrying pole pieces 21 having cylindrical external surfaces. Magnet 20 is fixed on a base 22 of plastic material by means of pins 23. The other end of magnet 20 has a cylindrical recess 24. A bearing carrier 25 is inserted in this recess, this body serving for accommodation of jewels 26 and 27 for the motor shaft 28. The rotor 13 and commutator 15 fixed on shaft 28 and the windings 17 accommodated on the rotor correspond in every practical respect to the same parts shown in FIGS. 1 and 2. The same applies for the brush holders 18 and brushes 19. The brushes of each pair are arranged at an angle of 20°, this resulting in a working angle of the windings, that is an angular range wherein each winding is continuously connected to the current souce, of 110°. The brush holders and a bearing 29, 30 for the motor shaft are fixed on a bearing bracket or bearing plate 31. The base 22 and the bearing plate 31 are assembled with a soft iron mantle 32 having an axial length equal to the axial length of the magnet 20 and pole pieces 21 respectively.

A homogeneous magnetic field is formed in the air gap between the pole pieces 21 and the soft iron mantle 32, whereby the circumferential extension of each side of the homogeneous field substantially corresponds to the circumferential extension of the cylindrical surfaces of the pole pieces 21. As stated above in connection with the embodiment shown in FIGS. 1 and 2 the circumferential extension of the homogeneous field portions is so chosen that each conductor of any current-carrying winding is completely within this homogeneous field portions during its full working angle, that is during each full period of continuous current flow in a winding. As stated above, the working angle is 110° and since the circumferential length of each winding is in the order of 45°, the homogeneous field portions should extend through an angle of at least 155°. In the embodiment shown in FIGS. 4 and 5 the above conditions are obtained when the distance D between the pole pieces 21 is 4 mm. with a radial width of the air gap of 2.65 mm. With these conditions the stray flux between the pole pieces may be kept within reasonable limits, but it is preferable to increase the distance between pole pieces 21 as much as possible as long as the fundamental condition may be fulfilled that all current-carrying conductors of any winding will be within a substantially homogeneous portion of the magnetic field.

Since the overall dimensions of the micro motor and consequently the dimensions of the permanent magnet 20 are relatively small it is of particular importance not to reduce the volume of the magnet. In the embodiment shown in FIGS. 4 and 5 a central bore of the permanent magnet is avoided by the fact that the motor shaft is pivoted substantially at one side of the permanent magnet so that the reduction of the magnet volume is limited to the fixing holes taking up pins 23 and to the recess taking up the bearing body 25. Further, since the motor shaft is completely outside the magnetic field no magnetic pulls in radial direction due to slight asymmetries of the motor shaft will occur, this being of importance for an absolutely indifferent and smooth operation of the motor.

While this invention has been described with reference to specific embodiments, other modifications are possible within the scope of the attached claims. As an example the dimensions and characteristics of the motors may be modified within relatively wide limits. The number of conductors of the windings may be chosen between 500 and 1200 whereby the induction in the air gap should be inversely proportional to the number of conductors in order to obtain corresponding characteristics.

What is claimed is:

1. A direct current motor comprising a rotor including a substantially cylindrical carrier, a plurality of multiple layer windings each winding having turns lying in diametrical planes of the carrier and whose opposite sides are embedded therein so that the outer turns are flush with the outer surface of the carrier, and a commutator having pairs of diametrically opposed conductive segments, opposite ends of each winding being connected each to one segment of one of said pairs of segments, each said winding and connected segments of the commutator subtending substantially the same angle of rotor displacement, brush means arranged to contact one of said pairs of segments to connect the segments of each pair to a direct current source during displacement of the rotor through said angle, and a flux conducting stator including permanent magnet means, a cylindrical member and a pair of opposed pole pieces having cylindrical surfaces each subtending an arc at least equal to the sum of the arcs subtended by two adjacent windings, said cylindrical member and pole piece cylindrical surfaces being coaxially positioned to define an annular air gap between them, said carrier and windings being disposed in and angularly displaceable through said air gap, the width of said air gap being less than the shortest distance between said pole pieces to reduce stray flux and provide homogeneous magnetic flux fields of substantially constant flux density in said air gap between each pole piece and the cylindrical member, whereby each said winding while connected to a direct current source through a pair of commutator segments and said brush means is completely inside one of said homogeneous flux fields during the total time of displacement of the rotor through said angle.

2. A direct current motor according to claim 1 wherein a pair of windings is provided lying in mutually perpendicular diametrical planes of the carrier.

3. A motor according to claim 1 wherein said brush means comprising pairs of brushes including contact springs of gold contacting said commutator on diametrically opposite segments thereof, the brushes of each pair enclosing an angle slightly exceeding the angular distance between adjacent commutator segments.

4. A direct current motor according to claim 3 wherein said windings are two in number connected to four of said conductive commutator segments, and the brushes of each pair of brushes are arranged at an angle of approximately 20°.

5. A direct current motor according to claim 4 wherein said permanent magnet means comprises a permanent magnet outside said rotor, yokes of magnetized material connected to said permanent magnet and enclosing said rotor, said yokes terminating in said pole pieces having pole surfaces of cylindrical shape, and said cylindrical member being a core of soft iron inside said winding carrier.

6. A direct current motor according to claim 1 wherein said homogeneous flux fields have a flux density in the order of 750 gauss.

7. A direct current motor according to claim 1 wherein said permanent magnet means comprises a permanent magnet of prismatic shape having opposite ends contacting said pole pieces, said pole pieces and said cylindrical member being made of soft iron, both said permanent magnet and pole pieces being disposed within said rotor.

8. A direct current motor according to claim 7 wherein said permanent magnet of prismatic shape is fixed against rotation with the rotor, said pole pieces having inner flat surfaces contacting flat opposite end surfaces of said permanent magnet.

9. A direct current motor according to claim 8 wherein said cylindrical carrier has a closure wall at one end which overlies one end of said prismatic permanent magnet, a bearing recess in said one end of the prismatic magnet, a shaft mounting said commutator and winding carrier supported at one end in said bearing recess and having its other end rotatably supported in a bearing plate spaced on the other side of said closure wall from said one end of the permanent magnet.

No references cited.

MILTON O. HIRSHFIELD, *Primary Examiner.*

J. W. GIBBS, *Assistant Examiner.*

UNITED STATES PATENT OFFICE
CERTIFICATE OF CORRECTION

Patent No. 3,290,528                  December 6, 1966

Karl Adler et al.

It is hereby certified that error appears in the above numbered patent requiring correction and that the said Letters Patent should read as corrected below.

Column 6, line 10, for the claim reference numeral "4" read -- 1 --.

Signed and sealed this 26th day of September 1967.

(SEAL)
Attest:

ERNEST W. SWIDER                  EDWARD J. BRENNER
Attesting Officer                     Commissioner of Patents